UNITED STATES PATENT OFFICE.

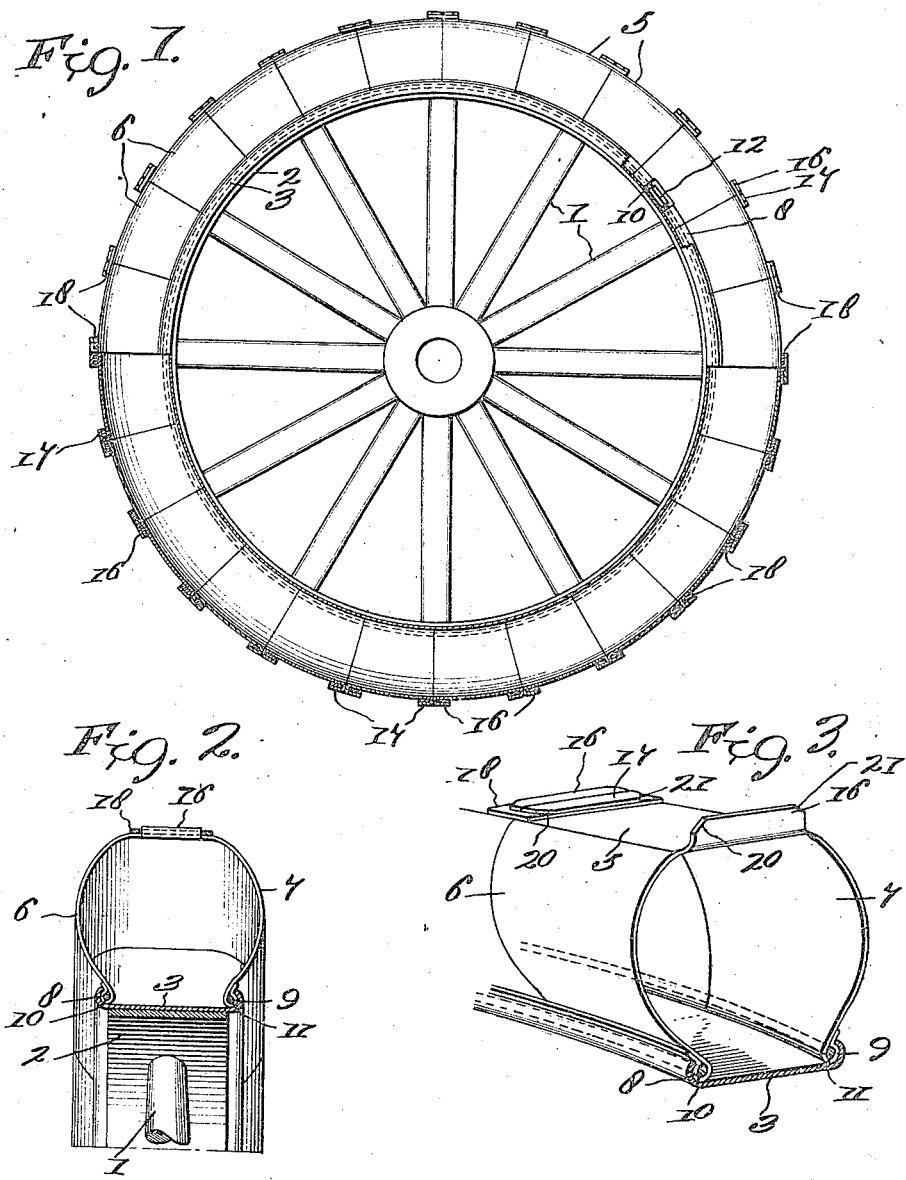

DANIEL S. MASON, OF STICKLEY, MONTANA.

ANTISLIPPING STEEL TIRE.

1,255,767.      Specification of Letters Patent.      Patented Feb. 5, 1918.

Application filed March 27, 1917. Serial No. 157,688.

*To all whom it may concern:*

Be it known that I, DANIEL S. MASON, a citizen of the United States, residing at Stickley, in the county of Stillwater and State of Montana, have invented certain new and useful Improvements in Antislipping Steel Tires, and I do hereby declare the following to be a full, clear, and exact description of the invention, such as will enable others skilled in the art to which it appertains to make and use the same.

The present invention relates to improvements in anti-slipping steel tires, and has for one of its objects to provide an improved resilient tire which will be composed of a series of independent sections or members fitted closely together and comprising each a tread portion and sides, which sides are connected by rods or other suitable means, and the tread portions of which are united by improved coupling means which at the same time provide a roughened or anti-slipping tread for the tire.

With these and other objects in view the invention consists in the novel details of construction and combinations of parts more fully hereinafter disclosed and particularly pointed out in the claims.

In the accompanying drawings forming a part of this application, and in which similar reference symbols indicate corresponding parts in the several views:

Figure 1 is a side elevational view of a wheel illustrating the improved tire partly in elevation and partly in section.

Fig. 2 is an enlarged cross sectional view through a portion of the wheel and tire.

Fig. 3 is an enlarged fragmentary perspective view of the tire; and

Fig. 4 is a perspective view of the improved coupling.

Referring more particularly to the drawings, 1 designates a wheel carrying a felly 2, and rim 3; all of which may be of the usual or approved construction, and which form no part of this invention.

The improved tire is made up of a series of independent sections or members, preferably constructed of resilient sheet metal, although other material may be advantageously employed, and each being shaped to provide, as more particularly shown in Fig. 3, a tread portion 5 which is relatively flat, thereby yielding a large traction surface as will be apparent from an inspection of Fig. 2, and curved sides 6 and 7 extending from the tread portion 5.

The free inner ends of the sides 6 and 7 of the tire sections are carried within the flanges of the rim 3, where their terminals are rolled over, as indicated at 8 and 9, about rods 10 and 11, such terminals being secured to the outer faces of the sides 6 and 7 in any suitable manner. As shown to the right in Fig. 1, the divided ends of each of the rods 10 and 11 are threaded and receive turnbuckles 12, through which the same may be drawn together and contracted in such a manner as to force the sections or members of the tire into close and compact relation such as will prevent relative slipping of the tire about the rim 3.

The tire members are also advantageously joined together at their tread portions, and for this purpose the ends of each of the treads 5 are furnished with tongues 16 and 17. These tongues are in the first instance made to stand at right angles to the treads 5, as shown by the tongue 16 in Fig. 3, and when in such position the next successive tire member is fitted close against the end of the preceding member in such manner that adjacent tongues 16 and 17 abut. Thereupon plates 18 which have slots 19 therein are received over the adjacent tongues 16 and 17, such tongues being advantageously supplied with beveled corners 20 and 21 for facilitating their engagement, and when such plates 18 have been thus positioned, the tongues 16 and 17 are overturned thereupon in opposite directions, as seen to the left in Fig. 3 and at the top of Fig. 1. This forms a convenient means of uniting adjacent members of the tire, and as such joint is made at the tread portion, the same will also have the effect of producing an anti-slipping and non-skid traction surface.

It will also be apparent that the abutting sides of the tongues 16 and 17 will prevent the tire sections from moving over one another in an overlapping relation.

It is obvious that those skilled in the art may vary the details of construction and arrangements of parts without departing from the spirit of my invention, and therefore I do not wish to be limited to such features except as may be required by the claims.

I claim:

An improved vehicle tire including a series of resilient sections fitted with their ends abutting and bent into substantially cylindrical form with their central parts flattened to produce an extensive tread, tongues extending from the flattened tread parts having beveled corners, plates having slots with parallel walls arranged substantially at right angles to the direction of travel and adapted to be received over adjacent tongues on proximate sections, the tongues coming in contact with the parallel walls and being bent down against the outer faces of said plates, substantially as described.

In testimony whereof, I affix my signature.

DANIEL S. MASON.